United States Patent [19]
Aumont et al.

[11] Patent Number: 6,048,034
[45] Date of Patent: Apr. 11, 2000

[54] SEAT INCLUDING AN INTEGRATED SEAT BELT

[75] Inventors: Jean-Claude Aumont, Etrechy; Patrick Daniel, Paris, both of France

[73] Assignee: Bertrand Faure Equipements S.A., Boulogne Cedex, France

[21] Appl. No.: 09/200,461

[22] Filed: Nov. 27, 1998

[30] Foreign Application Priority Data

Nov. 28, 1997 [FR] France .................................. 97 15189

[51] Int. Cl.$^7$ .................................................. B60R 22/00
[52] U.S. Cl. ........................ 297/478; 297/481; 297/216.1
[58] Field of Search ..................... 297/474, 475, 297/480, 481, 478, 216.1, 216.18, 216.19; 280/801.1, 806

[56] References Cited

U.S. PATENT DOCUMENTS

| | | | |
|---|---|---|---|
| 3,977,725 | 8/1976 | Tengler et al. | 297/216.1 |
| 4,229,041 | 10/1980 | Werner | 297/216.1 |
| 4,248,480 | 2/1981 | Koucky et al. | 297/216.1 |
| 4,314,715 | 2/1982 | Duguet et al. | 297/474 |
| 4,738,485 | 4/1988 | Rumpf | 297/480 |

FOREIGN PATENT DOCUMENTS

| | | |
|---|---|---|
| 0 522 730 | 1/1993 | European Pat. Off. . |
| 1379692 | 10/1964 | France . |
| 1248251 | 8/1967 | Germany . |
| 2 141 274 | 3/1973 | Germany . |
| 1138449 | 1/1969 | United Kingdom . |

*Primary Examiner*—Anthony D. Barfield
*Attorney, Agent, or Firm*—Pollock, Vande Sande & Amernick

[57] ABSTRACT

In an automobile vehicle, a seat assembly includes a seat belt and a seat belt inertia reel attached to the seat. The reel is equipped with belt locking means. Also included is a seat pan position adjustment means that enables a seat pan to be inclined by pivoting around a transverse horizontal axis. The inertia reel is attached to the seat pan and is installed so as to pivot around an axis that is substantially parallel to the transverse horizontal axis. A correction mechanism corrects the angular position of the inertia reel with respect to the seat pan according to the inclination of the seat pan.

13 Claims, 6 Drawing Sheets

SEAT INCLUDING AN INTEGRATED SEAT BELT

FIELD OF THE INVENTION

The invention concerns automobile vehicle seats including an integrated seat belt.

More precisely, the invention concerns seats including a so-called "incorporated" self winding seat belt, or inertia reel seat belt, where the automatic seat belt winder is attached to the seat and not attached directly to the chassis or the structure of the vehicle.

BACKGROUND OF THE INVENTION

Whatever the type of self winding seat belt, the inertia reel, i.e. the automatic belt winder, elastically returns the belt, once attached, to keep it tensioned against the chest of the passenger and the belt is therefore automatically adapted to the passenger's morphology. In normal vehicle utilization conditions, the belt can be freely unwound opposing the elastic returns means of the inertia reel. However, when a shock to the vehicle tends to throw the passenger forward, for example during an accident, a high deceleration, or in a curve taken at high speed, the inertia reel blocks the movement of the belt by means of a locking mechanism integrated into the inertia reel, of the type known by a person skilled in the art, to securely hold the user against the seat.

To ensure correct operation of the locking mechanism, the orientation of the mechanism in relation to the vertical or the horizontal must be relatively accurate otherwise there is a risk that the belt will not lock or, inversely, the inertia reel may remained locked even under normal vehicle utilization conditions.

In vehicles where the inertia reel is attached to the chassis or the structure of the vehicle, the position of the inertia reel is defined by the attitude of the vehicle and is therefore independent of the seat adjustment position.

In vehicles including seats with an integrated belt, it is known to place the inertia reel in the backrest of the seat. As the backrest of the seat can be inclined, the inertia reel is equipped with means for automatically correcting the relative orientation of the locking mechanism in relation to the backrest, according to the inclination of the backrest, to ensure correct operation of the locking mechanism irrespective of the inclination. However, these correction means integrated into the inertia reel considerably increase cost.

Also, to improve user's comfort, the seat may include means for adjusting its height or for inclining the seat pan, as is shown, for example, in French Patent document FR A 2433433. The inclination adjustment means, also called tilt adjustment, enable the seat pan to be inclined by pivoting around a transverse horizontal axis. The height adjustment means enable the height of the seat pan to be modified in relation to the floor of the vehicle.

These height adjustment means can be made so that they induce a movement of the seat parallel to itself, for example by a deformable parallelogram system, these systems then being called parallel height adjustment systems. The vertical movement of the seat pan can also be accompanied by a variation in the inclination of the seat pan, the system then being called a non-parallel height adjustment system, the adjustment means simultaneously ensuring the height adjustment and the tilt adjustment. In both cases, the seat can also include specific tilt adjustment means independent from the height adjustment means. Such seats can include a hinged backrest adjustable in inclination in relation to the seat pan. The backrest framework can also be fixed in relation to the seat pan framework or be common with it, in which case it is the position of the whole seat assembly which is adjusted by the height adjustment and tilt adjustment means.

The aim of this invention is to propose a seat including adjustment means capable of varying the inclination of the seat pan and including a safety belt with an inertia reel integrated into the seat. Its purpose is, in particular, to propose a new system enabling correct operation of the inertia reel to be ensured, irrespective of the inclination of the seat pan, while using conventional-type inertia reels, not including integrated correction means, and therefore less costly than the latter.

With these targets in mind, the subject of the invention is a seat for automobile vehicles including a seat belt and a belt inertia reel attached to the seat and equipped with seat belt locking means, and seat pan position adjustment means enabling the seat pan to be inclined by a pivoting movement around the transverse horizontal axis characterized in that the inertia reel is attached to the seat pan and installed so as to pivot around an axis more or less parallel to the transverse horizontal axis, and the seat includes first correction means to correct the angular position of the inertia reel in relation to the seat pan, according to the inclination of the seat pan and thus conserve a more or less constant orientation of the inertia reel in relation to the vehicle. According to a first design, the first correction means include a pivoting cam acting on the casing of the inertia reel or, according to a second design, the first correction means include a sliding cam acting on the casing of the inertia reel.

It is specified that the seat pan position adjustment means signify both the specific tilt adjustment means acting only on the inclination of the seat pan and the means ensuring combined and simultaneous adjustment of the inclination and the height of the seat pan.

The correction means, for example in the form of a cam, are installed on the framework of the seat pan and are shaped to act directly on the inertia reel. The latter is installed so as to pivot around a pin also attached to the framework of the seat pan. The correction means are coupled with the position adjustment means, for example by means of a linkage or a cable, so that, maneuvering the adjustment means automatically commands the correction means, for example by activating the rotation of the cam.

According to a specific arrangement, the seat includes both specific tilt adjustment means and non-parallel height adjustment means enabling the height of the seat pan to be modified by a non-parallel movement of the seat pan in relation to the floor of the vehicle, the first correction means mate with the height adjustment means and the seat pan includes second correction means, combined with the first correction means, and shaped to mate with the tilt adjustment means, to correct the angular position of the inertia reel in relation to the seat pan according to the position of the tilt adjustment means.

In this case, the seat includes tilt adjustment means independent of the height adjustment means. The two correction means are coupled together and moreover are directly coupled, for example, by means of linkages or cables, to the associated adjustment means, so as to give the inertia reel the angular position required for any tilt adjustment or height adjustment modifying the inclination of the seat pan.

As the correction means are combined together, when the user operates either alternately or simultaneously the seat pan height and tilt adjustment means, the correction means act always in an adequate manner on the angular position of the inertia reel.

In this specific arrangement, and according to a first design, the correction means include a first pivoting cam nested within a second pivoting cam placed around the first cam, each of the cams being respectively connected to one of the adjustment means.

The first cam can be installed so as to pivot around a pin attached to the framework of the seat pan and its pivoting is, for example, controlled by the height adjustment means. The second cam includes a hole shaped to house the first cam and comes into contact with the inertia reel, and its pivoting is controlled by the tilt adjustment means. This nested arrangement of the two cams enables a variation in the distance between the pivoting axes of the cams to be obtained when the two cams rotate.

The combined arrangement of the correction means enables a correction of the angular position of the inertia reel to be ensured when an action is made on one or the other of the two seat pan adjustment means or on the two simultaneously. Also, the adjustment mechanism made thus is compact and small.

According to a second design, also for the case where the seat includes both non-parallel height adjustment means and specific tilt adjustment means, the correction means include a truncated cone-shaped cam pivoting around a rotation axis and translatable axially along the axis, the pivoting control means and the truncated cone cam translation control means being respectively connected to the tilt adjustment means and to the height adjustment means.

The cam is installed so as to pivot around a pin attached to the framework of the seat pan and can also slide along this pin. As it is substantially shaped in the form of a truncated cone, when the rotational movement of the cam is fixed but moves in translation, the inertia reel bears then on the oblique generatrix of the cam and a pivoting of the inertia reel is obtained by the variation of the distance between the axis of the cam and the contact point of the cam with the inertia reel. When cam translation movement is fixed and the cam is rotated, the radius made by an external spiral profile of the cam is varied also causing a pivoting of the inertia reel.

According to a third design, the correction means include a first deformable parallelogram attaching a support of the seat to a bellcrank installed so as to pivot around the seat pan hinge pin and a second deformable parallelogram connecting the bellcrank to the inertia reel, the support being fixed in position in relation to the vehicle and comprising a position datum in relation to which the orientation of the inertia reel remains constant irrespective of the variations in seat pan inclination.

The support is, for example, a lug attached to a movable part of a longitudinal adjustment slide of the seat, to which the seat is attached by pivoting links used to adjust the position of the seat pan, especially to adjust the height. According to a specific arrangement, the bellcrank consists of two arms which extend radially from the ends of a tube.

In this specific arrangement, the arms are connected to the support and to the inertia reel by a metallic wire, the ends of which are attached to the support and to the inertia reel respectively, and a center elastically deformable portion is held onto the ends of the arms.

The invention will be better understood and other advantages will appear in the description which will be given, as an example, of a seat pan in compliance with the invention. Refer to the appended drawings on which:

DETAILED DESCRIPTION OF THE INVENTION

Figure 1:
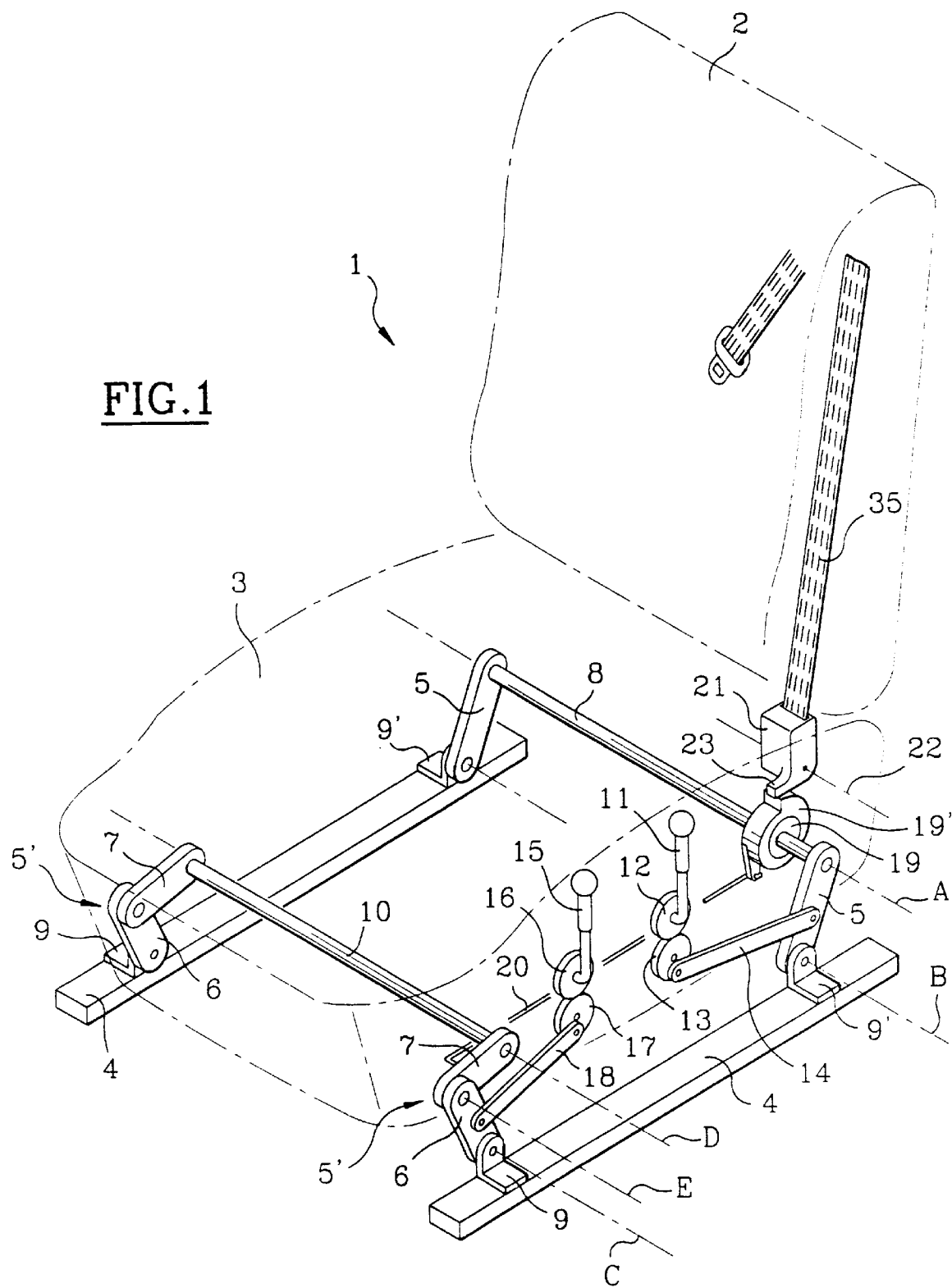
FIG. 1 shows a perspective view of an automobile vehicle seat including independent seat pan tilt and height adjustment means, and correction means according to a first design.

Seat 1, shown schematically on FIG. 1, is attached to the floor of the automobile vehicle by means of two slides 4 which enable a longitudinal adjustment of the position of the seat.

The seat includes height adjustment means and tilt adjustment means especially including links 5, 6 and 7. The two links 6 and 7, located at the front of the seat are hinged together by one of their ends to form a torque link 5' with an axis E. The other end of the link 7 is attached to a front connecting bar 10 installed so as to pivot around an axis D of the seat pan framework, and the other end of the link 6 is articulated around an axis C on a lug 9 attached to a mobile portion of the slide 4.

The link 5, located at the rear of the seat, has a first end attached to a rear connecting bar 8, installed so as to pivot around an axis A on the seat pan framework, and a second end articulated at B on another lug 9' attached to the mobile portion of the slide.

The link 5 and the torque link 5' form, on each side of the seat, the two opposite sides AB and CD of a deformable quadrilateral ABCD the two other sides of which are formed respectively by the slide and the framework of the seat pan.

Deformation of the quadrilateral ABCD causes a variation in height of the seat pan. Also, a modification of the angle between the two links 6 and 7 of the torque link 5' causes the seat pan to pivot around the axis A as shown on FIG. 3.

A description will now be given, only as an example, of a tilt adjustment control and a height adjustment control, enabling the quadrilateral ABCD to be deformed as described above.

In the example shown on FIG. 1, the height adjustment means control, located on one side of the seat pan, includes a lever 11 connected to a first toothed wheel 12 which mates with a second toothed wheel 13, the two wheels 12 and 13 being installed so as to pivot on the seat pan framework. The wheel 13 includes an eccentric for a rod 14 hinged on the link 5 of the seat.

The movement of the rod 14 causes an angular movement of the link 5, according to a direction imposed by the direction of movement of the lever 11 and the rotational direction of the wheels 12 and 13. The pivoting of the link 5 causes, by deformation of the deformable quadrilateral ABCD, a vertical movement of the seat pan in relation to the floor of the vehicle.

Figure 2:
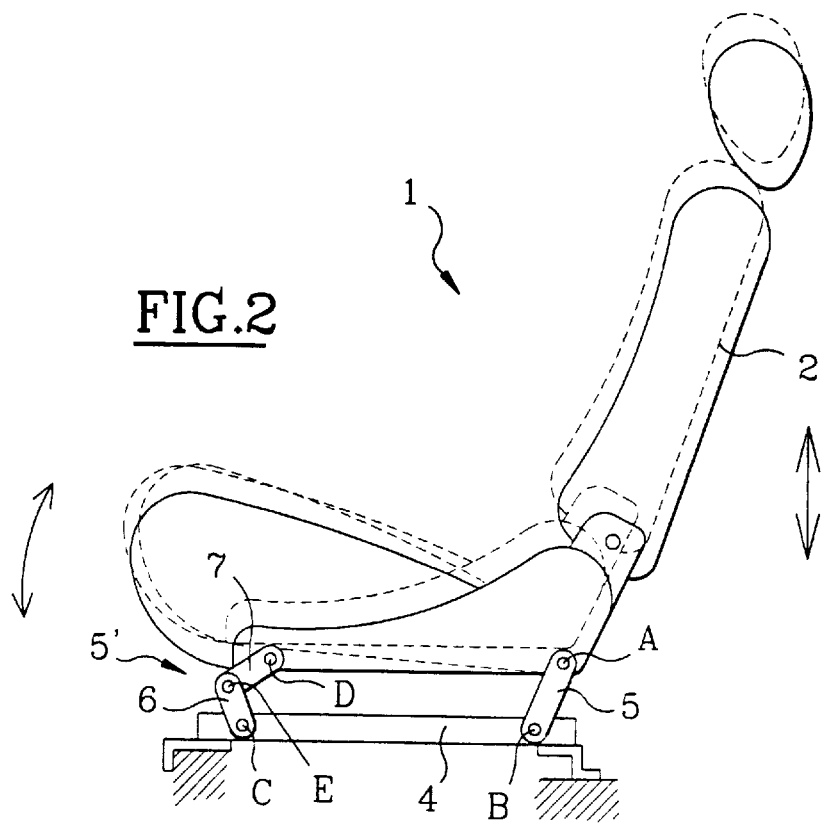
FIG. 2 is a side view showing a modified position of the seat, in dotted lines, obtained after a tilt adjustment and a height adjustment, modifying the inclination of the seat pan and the height of the seat respectively.

The movement of the seat pan can be parallel to the floor of the vehicle, as shown on FIG. 2, when the distance between the hinge pins C and D of the links 6 and 7 is equal to the length AB of the link 5 or, if not, a non-parallel movement inducing, moreover, a variation in the tilt of the seat. The height adjustment means are equipped with a lock (not shown) holding the seat at selected height.

The tilt adjustment control, similar to the height adjustment control, includes a lever 15 attached to a first toothed wheel 16 which mates with a second toothed wheel 17, the two wheels 16 and 17 being installed so as to pivot on the seat pan framework. The wheel 17 includes an eccentric for a rod 18 hinged on the link 6 of the seat. The tilt adjustment means are equipped with a lock (not shown) holding the selected inclination of the seat pan in relation to the floor of the vehicle.

Figure 3:
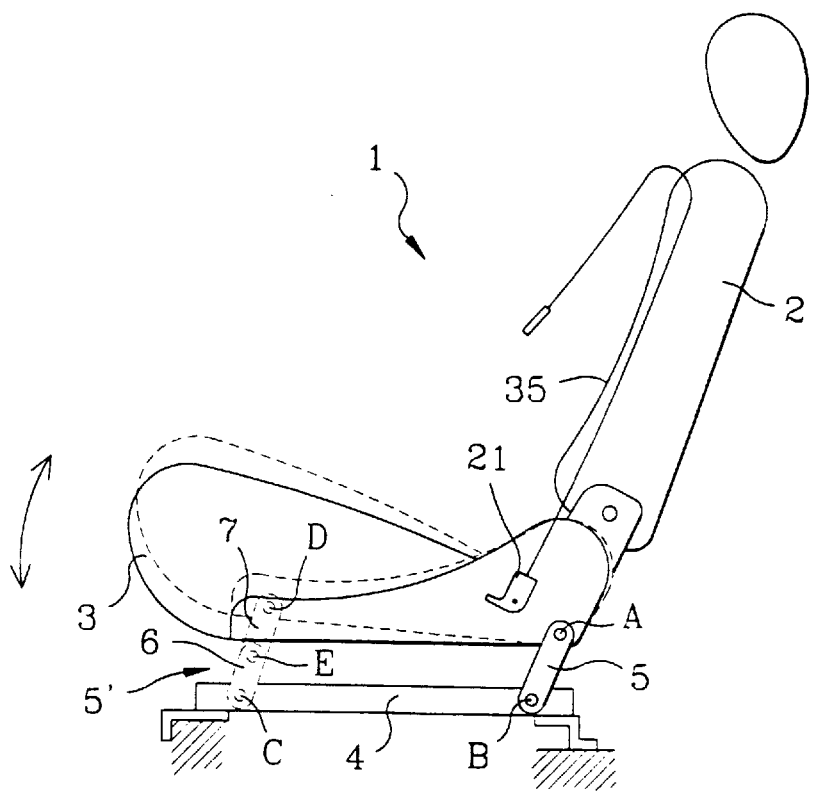
FIG. 3 is a view corresponding to FIG. 2 showing an adjustment to the inclination of the seat in dotted lines, obtained only by adjusting the tilt.

When the angular position of the link 5 is previously fixed, the movement of the rod 18 causes an angular movement of the link 6 and, therefore, a modification in the angle between the two links 6 and 7. The inclination of the seat pan in relation to the floor of the vehicle, as shown in FIG. 3, that is the tilt adjustment, is therefore obtained by a variation in the distance CD between the two hinge pins C and D of the links 6 and 7.

It is however specified that the use of correction means in compliance with the invention and as described below is not limited to only the tilt adjustment and height adjustment means shown on FIG. 1 only as an example but can also apply to all other tilt or height adjustment systems.

The seat 1 includes an inertia reel 21 with an integrated seat belt locking mechanism of a conventional type and known by a person skilled in the art. The inertia reel is installed so as to pivot around a pin 22 attached to the framework of the seat pan more or less parallel to the rear connecting bar 8. As shown on FIG. 3, the seat belt 35, leaving the inertia reel casing, passes inside the backrest 2 and comes out at the upper part of the backrest.

The angular position of the inertia reel must be corrected in relation to the seat pan so that the seat belt locking mechanism will always be correctly orientated irrespective of seat pan inclination adjustment position.

For this purpose, the correction means, shown on FIG. 1, include a first cam 19 attached to the rear connecting bar 8 and with a cylindrical profile having an axis parallel to the axis A. A second cam 19', installed so as to pivot around the first cam 19, enters into contact with an arm 23 made on the housing of the inertia reel 21 and with a spiral profile.

The inertia reel is held in contact with the second cam 19', for example by means of a spring (not shown) the ends of which can be connected to the casing of the ginertia reel and to the framework of the seat pan respectively.

A linkage 20, made for example of a stiff steel wire, connects the second cam 19' to the link 6 or 7 so that the rotation of the cam 19' is controlled directly by the tilt adjustment means, for example as shown of FIG. 1, by the angular movement of the link 7. As the first cam 19 is attached to the connecting bar 8, the height adjustment means control acts on the angular position of the cam 19 by means of the link 5.

When the tilt adjustment means are held in a fixed position, an action on the height adjustment means control therefore causes the first cam 19 to pivot in relation to the seat pan which leads to a movement of the rotational axis of the second cam 19' and, therefore, to a variation in the distance between, on one hand, the contact point of the arm 23 of the inertia reel on the second cam 19' and, on the other hand, the axis A of the first cam 19, thus ensuring the pivoting of the inertia reel.

When, on the contrary, the height adjustment means are held fixed, and the tilt adjustment means control is operated, the second cam 19' pivots around the first cam 19 and the spiral profile of the second cam also enables a variation to be obtained in the distance between the contact point of the inertia reel on the second cam and the axis A of the first cam.

It is quite possible to simultaneously operate the tilt adjustment means control and the height adjustment means control, the angular correction of the inertia reel being achieved by a simultaneous combination of the movements of the two cams 19 and 19' as described above.

Figure 4:
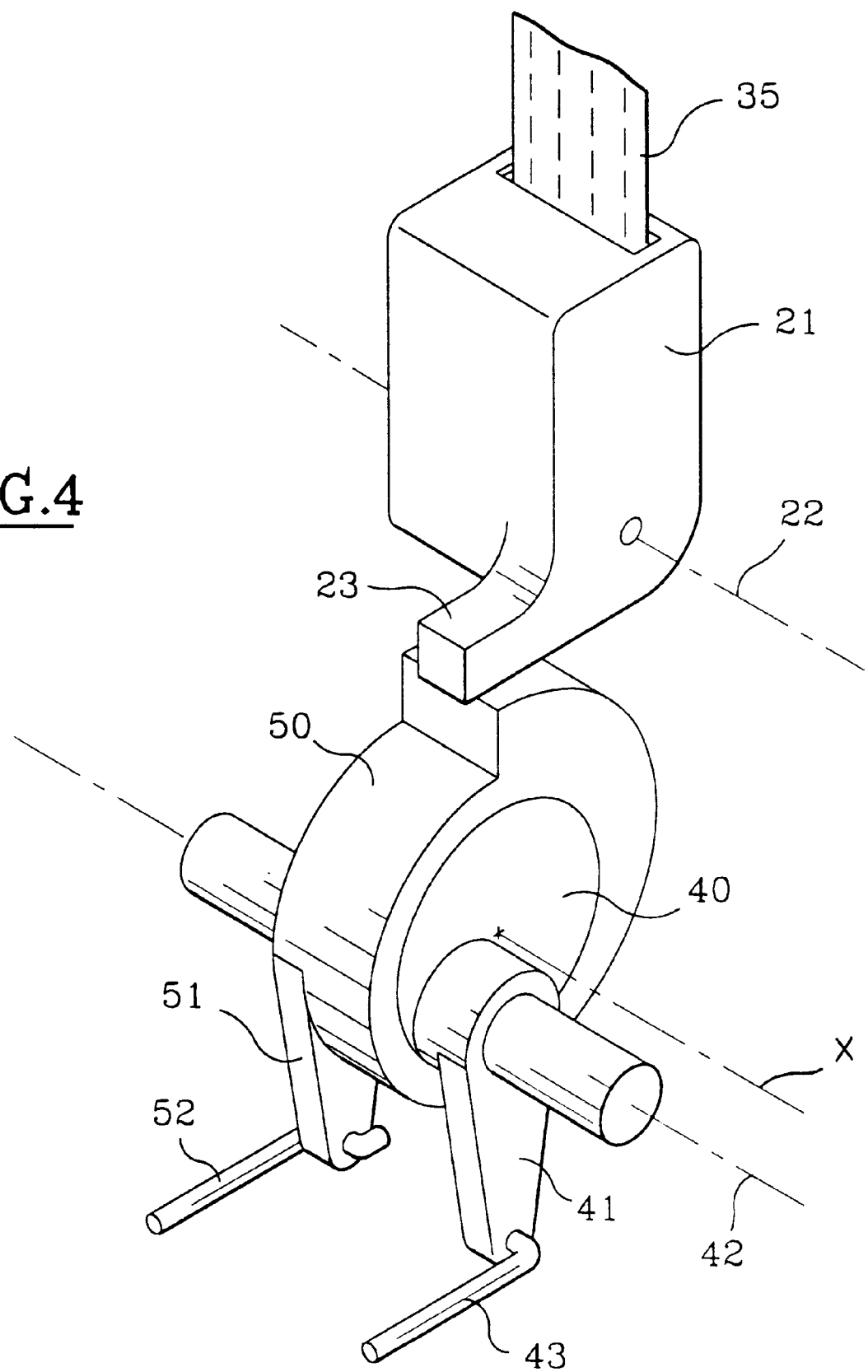
FIG. 4 is a detailed view showing the first and second inertia reel angular position correction means made by using two linked cams, according to a variant of the first design.

In a variant of the first design, shown on FIG. 4, a first cam 40 with a cylindrical profile, is installed so as to pivot around a shaft 42 attached to the seat pan framework. The first cam is housed in a hole made in the second cam 50 with a spiral profile.

The first and second cams 40, 50 are connected respectively, by means of linkages 43 and 52 made, for example, from stiff steel wire, to the tilt adjustment means and to the height adjustment means. The correction of the angular position of the inertia reel is obtained, as described previously, by the movement of the rotational axis X of the second cam 50 when an adjustment acting on linkage 43 is made, or by the rotation of this second cam 50 around axis X when an adjustment acting on linkage 52 is made.

Note that in this variant the shaft 42, around which the first cam 40 pivots, can be oriented in any way in relation to the seat pan. It is however possible to advantageously use the connecting bar 8 as a rotational shaft for the first cam 40.

Figure 5:
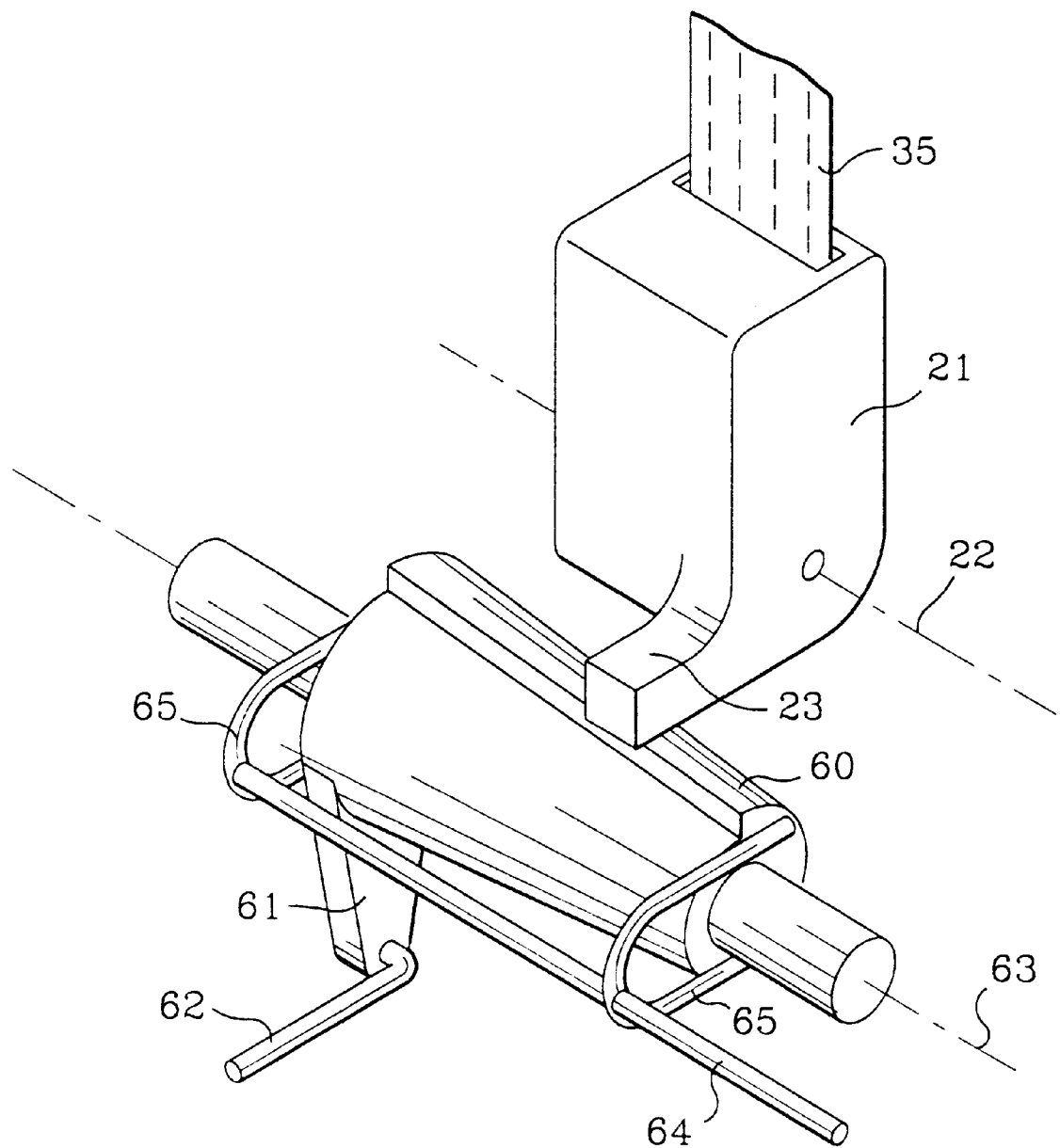
FIG. 5 is a detailed view showing a second design for the correction means made by using a cam with a more or less truncated cone shape.

The correction means, according to a second design shown on FIG. 5, include a cam 60 with a truncated cone shape which can slide on and pivot around a pin 63 attached to the seat pan framework. Rotational control means 62, for example, a linkage made of stiff steel wire, connect the tilt adjustment link 7 to a lug 61, made on the cam, extending substantially perpendicularly to the cam rotational pin 63. Cam translation control means 65, for example, forks, connect the cam 60 to the height adjustment link 5 by means of a cable 64.

When the cam is fixed in rotation but driven in translation, the arm 23 of the inertia reel bears on the oblique generatrix of the cam and the translation movement of the cam enables a variation in the distance between the inertia reel contact point on the cam and the pin 63 of the cam to ensure the required pivoting of the inertia reel in relation to the seat pan height adjustment.

However, when the cam is fixed in translation but is driven in rotation, the spiral profile of the cam then enables another variation of the distance to be obtained but this time according to the tilt adjustment.

A description will now be given of the third design, in relation to FIGS. 6 and 7, where use is made of the first and second deformable parallelograms ABFG and GAIH connecting the inertia reel to a lug 9' attached to the mobile portion of the slide 4.

Figure 6:
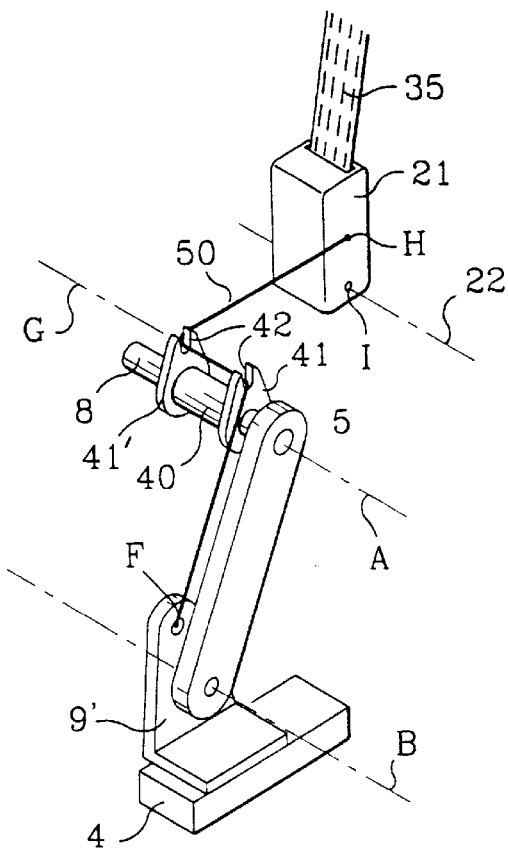
FIG. 6 shows a perspective view of a third design for the correction means using a deformable parallelogram system.

During installation, a metallic wire 50', shown on FIG. 6, has its ends F and H connected to a lug 9' attached to the mobile portion of the slide 4 and to the inertia reel 21 respectively.

The wire 50' is also bent along a direction G, so that a center portion of the wire is supported by two arms 41" and 41' which extend parallel to each other and radially from the ends of a cylindrical tube 40' installed so as to pivot around seat pan pivoting axis A. The center portion of the wire lies in the notches 42" made in the ends of the arms 40" and 41', and is elastically twistable.

It can be seen that the use of the wire enables the installation to be simplified by reducing the number of parts required to connect the inertia reel to the lug 9' attached to the slide 4, thus reducing the time required for installation.

Figure 7:
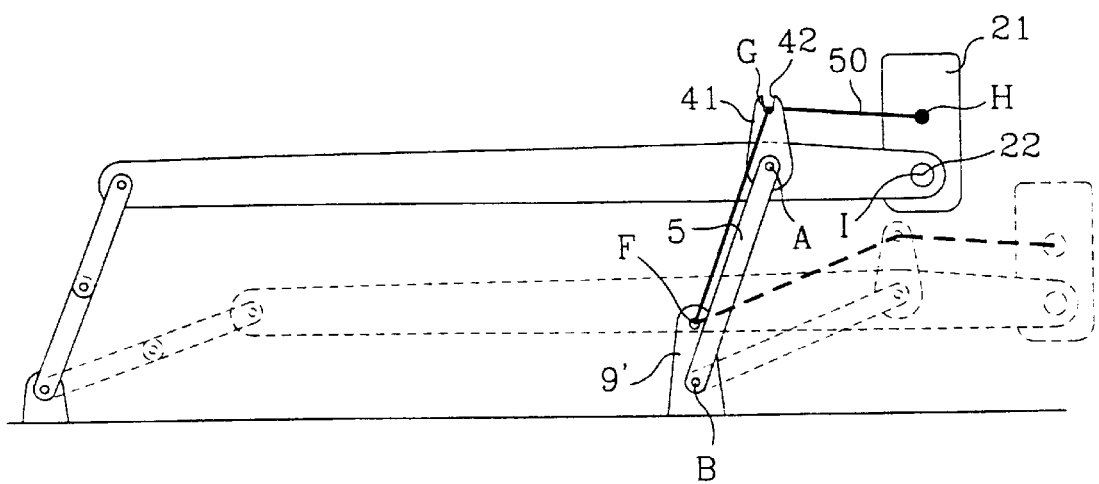
FIG. 7 is a side view corresponding to FIG. 6 showing the operating principle of the inertia reel angular correction.

As shown on FIG. 7, the tilt adjustment link 5, the lug 9', the arm 41" and a first portion of the wire 50' form sides AB, FB, FG and GA respectively of the first deformable parallelogram ABFG. The arm 41' forms a side GA of the second deformable parallelogram GAIH where the other sides HI and GH respectively consist of the inertia reel 21 and the second portion of the wire 50.

The first parallelogram deforms under the action of the height adjustment means, as shown in FIG. 7, when the seat pan is moved from a current utilization position to a modified position shown by dotted lines. The second parallelogram deforms under the action of the tilt adjustment means by the pivoting of the seat pan around axis A.

When the seat pan inclination is modified, by any height or tilt adjustment, the sides BF, GA and HI always remain parallel to each other, the vertical orientation of the inertia reel 21 being imposed by the side BF of the lug 9' attached to the slide 4. As the angle between the portions FG and GI is modified, the center portion of the wire is twisted.

In relation to FIGS. 8 to 11 a description will now be given of the correction means design variants used for a non-parallel height adjustment of the seat pan. It is recalled that the non-parallel height adjustment is obtained, in the case of an adjustment system as shown on FIG. 1, when the distance between the hinge pins C and D of the links 6 and 7 is different from the length AB of the link 5.

Figure 8:
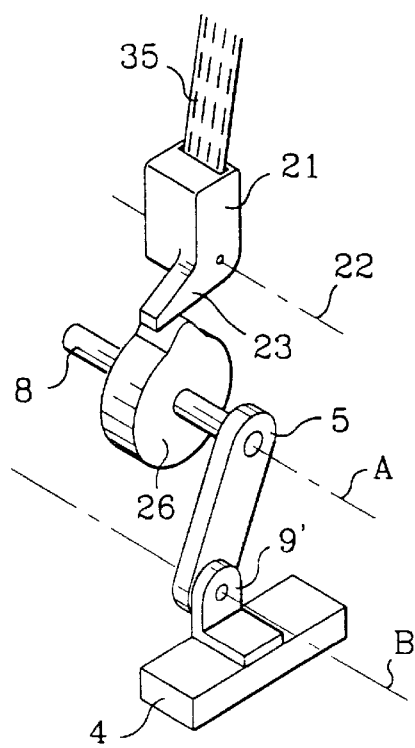
FIGS. 8 to 11 show different design variants of the correction means, usable for a seat including only non-parallel height adjustment means.

As shown on FIG. 8, the arm 23 of the inertia reel 21 comes into contact with a cam 26 attached to the connecting bar 8. When the cam rotates around pin A, the profile of the cam ensures the variation in the distance between the contact part of the arm 23 of the inertia reel on the cam 26 and the pin A, to ensure the pivoting of the inertia reel.

Figure 9:
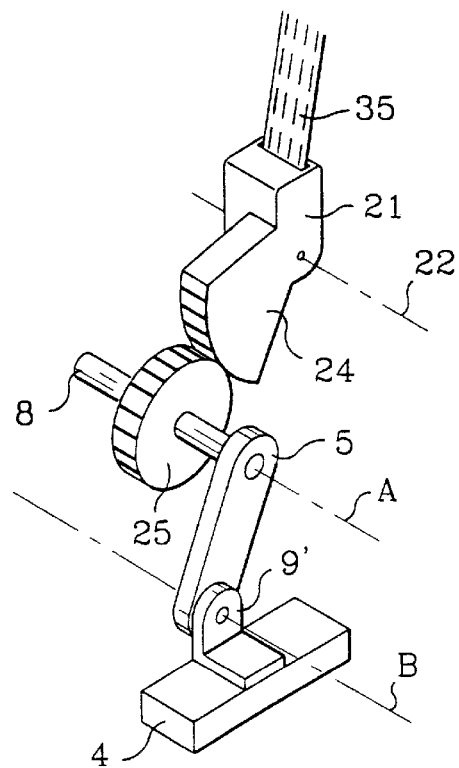

In the variant shown on FIG. 9, a toothed wheel 25, attached to the connecting bar 8, mates with a toothed segment 24 made on the inertia reel.

Figure 10:
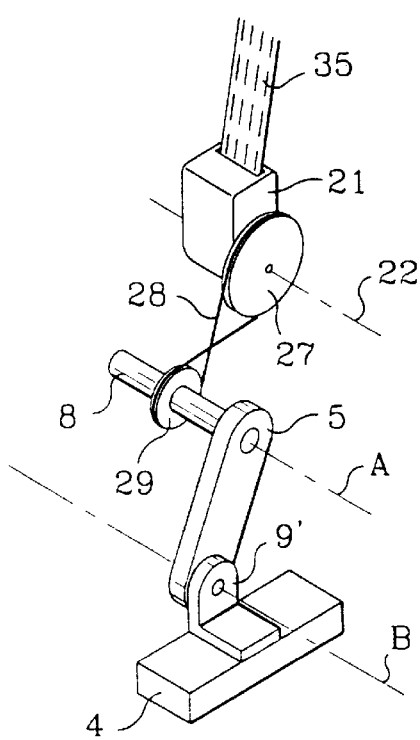

FIG. 10 shows a first pulley 29, centered on and attached to the articulation bar 8, connected to a second pulley 27, centered on the rotational axis 22 of the inertia reel and attached to the inertia reel 21 by means of a belt 28 shaped to reverse the rotational direction of the two pulleys.

Figure 11:
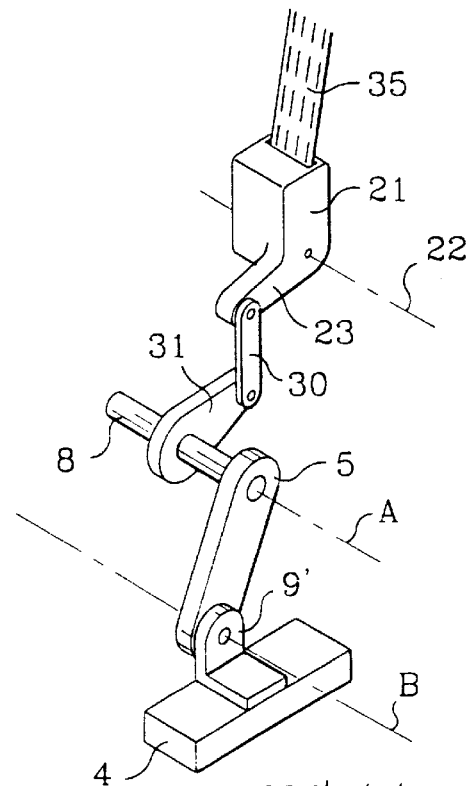

In the case shown on FIG. 11, a plate 31 comprises a lever for a rod 30 the ends of which are hinged on the arm 23 of the inertia reel and on the plate. When the plate moves vertically upwards or downwards, the rod 30 ensures the pivoting of the inertia reel.

The correction means, described above in relation with FIGS. 8 to 11, are not limited to ensuring the correction of the angular position of the inertia reel for a non-parallel height adjustment. Indeed, these correction means could also be used for a tilt adjustment provided that an adaptation is made in the connection of the correction means to the tilt adjustment means.

The invention is not limited to the designs described above only as an example. In particular:

the manual controls of the tilt adjustment means and of the height adjustment means, such as described in the invention, could be replaced by any other control means and especially by electric actuators. In this case, the correction means could be coupled to the tilt adjustment and height adjustment means, for example, by means of a wheel-wormscrew type mechanism where the wheel could be attached to the inertia reel to ensure its pivoting, If electric actuators are used, an electric motor could control the pivoting of the inertia reel, for example, by means of a toothed pinion attached to the motor shaft mating with a toothed segment made on the inertia reel. The electric motor could be of the step type so as to accurately control the angular position of the shaft of the motor to pivot the inertia reel through the required angle, the seat pan position adjustment systems, described only as an example in relation to FIGS. 1 and 3, are in no way restrictive for the invention. The correction means could be adapted to any other non-parallel height adjustment system and/or tilt adjustment system.

For an angular correction obtained by means of deformable parallelograms ABFG and GAHI, the parallelograms could include a common side, in particular AG, by using a single arm installed so as to pivot on seat pan pivoting axis A, also, in this case, as a replacement for the wire, separated links HG and GF could be used to connect respectively the inertia reel 21 to the arm 41' and the arm 41 to the lug 9' attached to the slide 4.

We claim:

1. In an automobile vehicle, a seat assembly comprising: a seat belt, a seat belt inertia reel attached to the seat assembly and equipped with belt locking means, seat pan position adjustment means enabling a seat pan to be inclined by pivoting around a transverse horizontal axis, the inertia reel attached to the seat pan and installed so as to pivot around a second axis substantially parallel to the transverse horizontal axis, and first correction means to correct the angular position of the inertia reel with respect to the seat pan according to the inclination of the seat pan.

2. Seat assembly in accordance with claim 1 further comprising both specific tilt adjustment means and non-parallel height adjustment means, enabling the height of the seat pan to be modified by a non-parallel movement of the seat pan in relation to a floor of the vehicle, the first correction means mating with the height adjustment means, and the seat pan including second correction means combined with the first correction means and shaped to mate with the tilt adjustment means to correct the angular position of the inertia reel in relation to the seat pan according to the position of the tilt adjustment means.

3. Seat assembly in accordance with claim 2 wherein the first and second combined correction means include a first pivoting cam nested within a second cam pivoting around the first cam.

4. Seat assembly in accordance with claim 2, wherein the first and second combined correction means comprises: a truncated cone-shaped cam pivoting around a further axis that is substantially parallel to a plane containing the second axis, about which the inertia reel pivots, and a contact point between the inertia reel and the truncated cone-shaped cam, the cam being translatable axially along said further axis, pivoting control means and translation control means of the truncated cone cam respectively connected to the tilt adjustment means and to the height adjustment means.

5. Seat assembly in accordance with claim 1 wherein the first correction means include a pivoting cam riding on a casing of the inertia reel.

6. Seat assembly in accordance with claim 1, wherein the first correction means includes a sliding cam riding on a casing of the inertia reel.

7. Seat assembly in accordance with claim 1, wherein the first correction means is attached to a connecting bar attached to a height adjustment means and driven in rotation by said height adjustment means.

8. Seat assembly in accordance with claim 7, wherein the first correction means include a toothed wheel, attached to the connecting bar, mating with a toothed segment located on an inertia reel casing.

9. Seat assembly in accordance with claim 7, wherein the first correction means includes a first wheel attached to the connecting bar and mating, by means of a belt, with a second wheel attached to the inertia reel and centered on the second axis.

10. Seat assembly in accordance with claim 7, wherein the first correction means includes a plate attached to the connecting bar (8), the plate being connected to the inertia reel by means of a rod, a first end of the rod hinged to an arm extending from the inertia reel, and a second end of the rod being linked to the plate.

11. Seat assembly in accordance with claim 1, wherein the first correction means includes a first deformable parallelogram connecting a support of the seat to a bellcrank installed so as to pivot around the transverse horizontal axis, and a second deformable parallelogram connecting the bellcrank to the inertial reel, the support being fixed in orientation in relation to the vehicle, the first correction means having a position datum in relation to which the orientation of the inertia reel remains constant irrespective of the variations in seat pan inclination.

12. Seat assembly in accordance with claim 11, wherein the bellcrank includes two arms which extend radially from the ends of a tube that is coaxial with the transverse horizontal axis.

13. Seat assembly in accordance with claim 12, wherein the arms are connected to the support and to the inertia reel by a metallic wire, the ends of which are attached to the support and to the inertia reel respectively, and an elastically deformable center portion which is held on the ends of said arms.

* * * * *

UNITED STATES PATENT AND TRADEMARK OFFICE
CERTIFICATE OF CORRECTION

PATENT NO. : 6,048,034
DATED : April 11, 2000
INVENTOR(S) : Jean-Claude Aumond et al.

It is certified that error appears in the above-identified patent and that said Letters Patent is hereby corrected as shown below:

The last name of the first-named inventor is incorrect. "Aumont" should read --AUMOND--.

Signed and Sealed this

Fifth Day of June, 2001

Attest:

*Attesting Officer*

NICHOLAS P. GODICI
*Acting Director of the United States Patent and Trademark Office*